July 13, 1954　　　　　L. R. AMBROSE　　　　2,683,339
CONTACT POINT HOLDER
Filed Nov. 14, 1951　　　　　　　　　　　　　　2 Sheets-Sheet 1
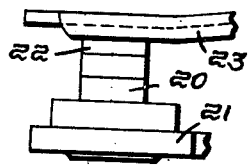
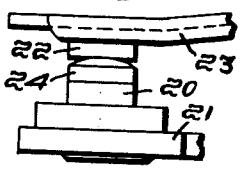
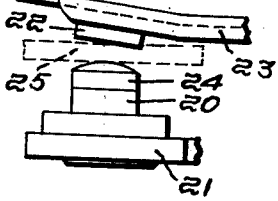
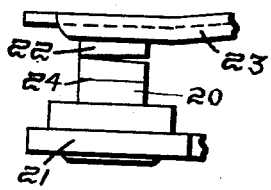
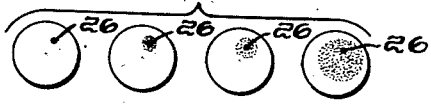
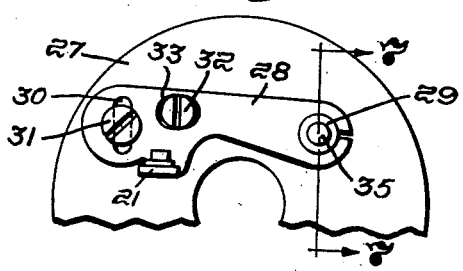
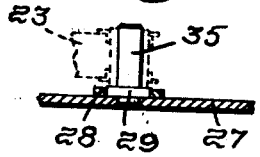
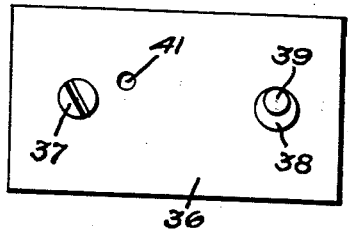
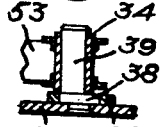
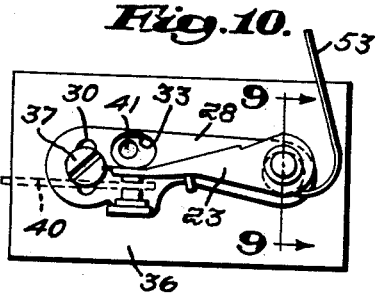
Inventor:
Leopold Raymond Ambrose,
by
Albert Spear
Attorney July 13, 1954   L. R. AMBROSE   2,683,339
CONTACT POINT HOLDER
Filed Nov. 14, 1951   2 Sheets-Sheet 2
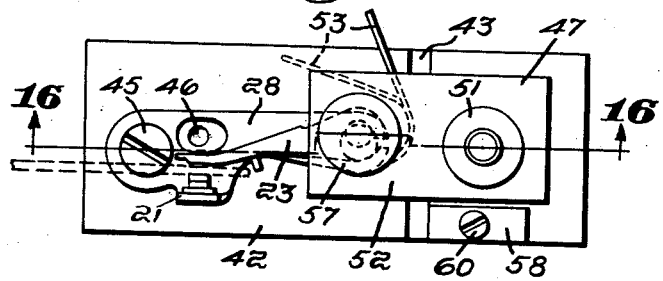
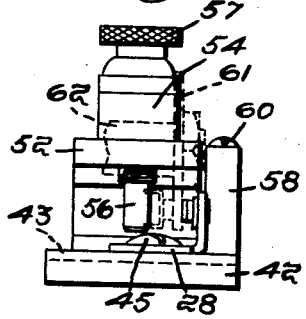
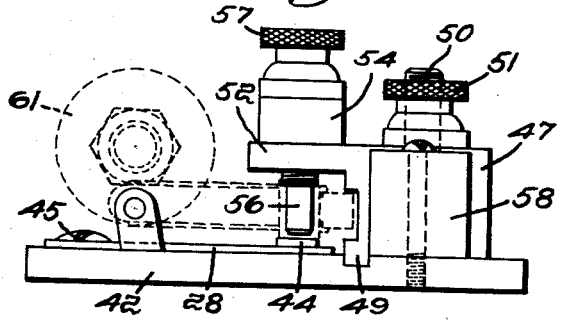
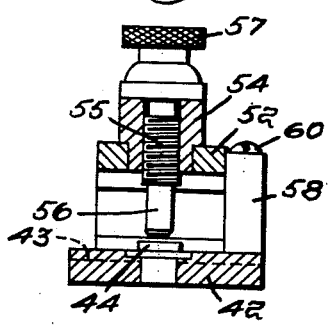
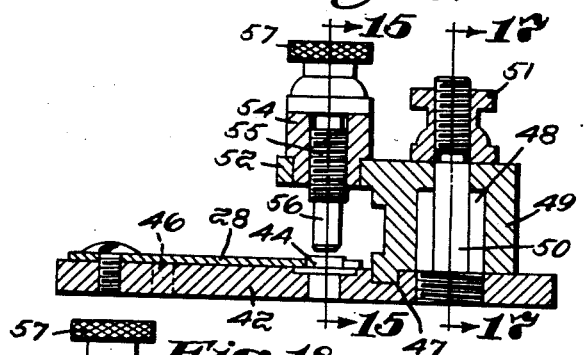
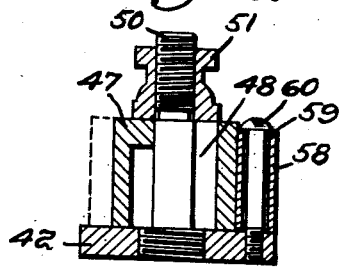
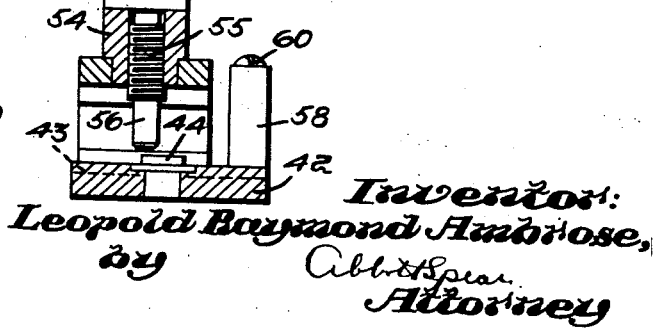
Inventor:
Leopold Raymond Ambrose,
by Abbt & Spear
Attorney Patented July 13, 1954

2,683,339

UNITED STATES PATENT OFFICE 2,683,339

CONTACT POINT HOLDER

Leopold Raymond Ambrose, Conway, N. H.

Application November 14, 1951, Serial No. 256,313

14 Claims. (Cl. 51—216)

This invention relates to holders for use in simultaneously dressing a pair of contact points of the type in which one of them is supported by a pivotable arm to swing into and out of engagement with the other.

While holders in accordance with the invention are adapted for use in dressing any such pair of points, particular reference is made to the points of distributors employed in automotive ignition systems as illustrative of the problems involved.

A fat strong spark is essential to the efficient operation of an automobile engine. For minimum electrical resistance, point faces would be flat and so supported that the entire area of one would engage with the other point, a condition hereinafter sometimes referred to as "parallelism." It will be appreciated, however, that one point is carried by a pivotable arm and that any minute variations, unavoidable in quantity production, in the supporting structure for either point, would result in the point faces being non-parallel when in engagement. As a compromise between low cost and efficiency, one of the tungsten discs is usually crowned or formed with a radius face to ensure engagement in a central area of somewhat larger extent than would result from the non-parallel meeting of flat surfaced points. For convenience, an installation utilizing a flat faced point and a crowned point or two crowned points are herein treated as providing approximate parallelism since a central area of contact is provided.

A principal objective of this invention is to provide holders that may be used to dress simultaneously distributor and like points installed in their supporting structure and to effect such dressing on a precision basis or on a precision and quantity basis thereby to make it possible to ensure parallelism between their engageable faces so that the working area can be increased and the electrical resistance lowered.

In accordance with the invention, each holder includes means to anchor the member carrying one of the points in a predetermined position and a pivotable support for the point carrying member positioned with reference to the anchoring means to relocate the members to effect a parallel relationship between the point faces when they are spaced apart a distance equal to the thickness of the dressing tool to be used.

The holder, when one member is fixed and the other member is an arm and both are mounted, in use, on concentric stud portions of different diameters, may consist of a base having a stud element for one member, means to cooperate therewith in anchoring that member in position, and a second stud element to pivotably support the other member and integral with the first stud element but eccentric relative thereto by an amount sufficient to effect a parallel position of the contact faces when a dressing tool of predetermined thickness is inserted therebetween.

When, however, dressing tools of different thickness are to be used with the same holder or when the same holder is to be used in dressing the distributor points of different makes and models of automobiles, the holder consists of a base provided with means to hold one of the members in a selected position. A mount is attached to the base to enable transverse movement to be effected therebetween relative to a first position. The mount includes means for pivotably supporting the other member and is so located that in the first position of the mount, the point faces have their original relationship when in engagement. The base also has a gage block attached thereto for movement into and out of a first position in which it abuts the mount when in the first position thereof. Both the mount and the gage block are provided with means to lock them in any of their positions.

With the gage block locked in its first position, a tool inserted between it and the mount spaces the mount with the member carried thereby accurately positioned to ensure parallelism of the point faces when that tool is inserted therebetween. The gage block is then unlocked for movement from its first position to enable the tool to be removed without injury to the adjacent faces of the block and mount.

In the accompanying drawings, illustrative embodiments of the invention are shown from which its several novel features and advantages, including those above referred to, will be readily apparent. The holders, while shown as for use in dressing the distributor points of automobile ignition systems, make evident the essential characteristics of holders in accordance with the invention for use in simultaneously dressing pairs of points of other systems.

In the drawings:

Fig. 1 is a fragmentary view, on an enlarged scale, showing the engagement of a pair of flat faced points, Fig. 2 is a similar view but with one of the points having a crowned face, Fig. 3 shows the structure of Fig. 2 and illustrates the non-parallel relationship between the point faces when a dressing tool is inserted therebetween, Fig. 4 is a view of the structure shown in Fig. 2 showing the effects of dressing point faces when they are not in parallel,

Fig. 5 is a plan view of a point face showing typical wear stages,

Fig. 6 is a fragmentary plan view showing the first or fixed point supporting member mounted on the distributor plate, Fig. 7 is a fragmentary section along the indicated lines 7—7 of Fig. 6, Fig. 8 is a plan view of a holder in accordance with the invention, Fig. 9 is a fragmentary section along the indicated lines 9—9 of Fig. 10.

Fig. 10 is a view similar to Fig. 8 but with the two point carrying members attached thereto, Fig. 11 is an end view of the holder, Fig. 12 is a plan view of another embodiment of the invention, Figs. 13 and 14 are, respectively, end and side views of the holder shown in Fig. 12, Fig. 15 is a section along the indicated lines 15—15 of Fig. 16 with the mount in its first position, Fig. 16 is a section along the indicated lines 16—16 of Fig. 12, Fig. 17 is a section along the indicated lines 17—17 of Fig. 16, and Fig. 18 is a sectional view, substantially similar to Fig. 15 but showing the amount shifted from its first position.

Before describing holders in accordance with the invention, reference is first made to Fig. 2 in which a point 20 is carried by a member 21 and the point 22 is carried by a member 23 which is a pivotable arm. Such points usually have their contact faces in the form of tungsten discs 24, although other metals and alloys may be used, and the disc 24 of the point 20 is shown as formed with a crowned or radius face.

In Fig. 1, the discs 24 are shown as flat-faced and in parallel when engaged to provide full face to face contact. The contact of parallel plane faces is the objective since the larger the working area of the engaged faces, the less the electrical resistance, and the less the transfer of metal from one face to the other. This objective can not be attained without the dressing of the contact faces after their attachment to the supporting structure because, in quantity production, the supporting structure can not be made sufficiently accurately to ensure parallelism between the planes of the contact faces when engaged.

The points shown in Fig. 2 are representative of those widely used and represent a compromise between production costs and efficiency since contact between them in a central area is ensured and with a working area somewhat better than would result if flat faced discs met in a non-parallel relationship.

In Fig. 3, an indicated point file 25 is shown as inserted between the contact faces and as will be apparent from that view, the resulting movement of the arm member 23 positions its point face at an angle to the plane generally defined by the point face of the member 20. Dressing of the points by the point file 25 thus tends to produce contact faces that are clearly non-parallel on engagement as is suggested in Fig. 4.

It has been noted that parallel engagement of installed contact points is an unrealized objective. It is widely appreciated that, in the case of distributor points, engine efficiency is dependent on their condition and that they wear during use. In Fig. 5, views are shown illustrating approximate wear stages. At the end of a short period of use, a typical working area is indicated at 26. Continued use results in the enlargement of this working area but is attended to a certain point, by the pitting of one face and the building up of a cone on the other face until the points are no longer fit for service. While points can not be accurately dressed while in place on the distributor plate 27, they are often touched up with a point file to improve their effectiveness but more often, they are removed and replaced by new points.

In Fig. 6, the member 21 is shown as a bracket disposed at right angles to the supporting member 28. Member 28 is apertured at one end to receive the stud part 29 by which it is pivoted to effect proper point spacing. At its other end, the member 28 is slotted as at 30 to receive the locking screw 31 by which it is anchored to the plate 27 once its adjusted position has been established. Such adjustments are effected by the eccentric 32 threaded into the plate 27 and fitting freely in the member slot 33.

The arm member 23 is provided with an insulated cylindrical bearing 34 dimensioned to fit the stud part 35 which is integral with but of smaller diameter than and concentric with the stud part 29.

In accordance with the invention, a holder for use in dressing the points attached to the members 21 and 23 may be of the type shown in Figs. 8–11. The holder shown in those views consists of a base 36 having a threaded bore to receive the anchoring screw 37 which extends through the slot 30 in the member 28. The base also supports a stud element 38 dimensioned to enter the aperture in the other end of the member 28. The stud element 38 is provided with a part 39 dimensioned to fit the bore of the arm member bearing 34 and it will be noted that the part 39 is eccentric relative to the stud element 38 to an extent sufficient to bring the point faces into parallelism when a dressing tool 40 is inserted therebetween. The points may then be accurately surfaced to increase their working area to the desired extent. With new points of which one is flat faced, the tool 40 would be safe cut, e. g. have one face smooth, to avoid unnecessarily altering the contact face of the other point. The base 36 is also provided with a threaded aperture 41 to enable the holder to be used in supporting the point carrying members used in a range of different makes and models of motor vehicles.

A holder of the type described is well adapted for use in effecting the dressing of point faces with any tool provided its thickness is equal to the amount that the part 39 is offset relative to the stud element 38.

For quantity production and where tools of different thickness are to be used, the embodiment of the invention shown in Figs. 12–18 is particularly well suited. In that embodiment, the holder consists of an accurately machined base 42 having a transverse groove 43 and a stud 44 which is entrant of the point receiving aperture in the point carrying member 28. The base 42 is also provided with a threaded bore to receive an anchoring screw 45 and a threaded bore 46 for use in the anchoring of the corresponding member of the distributor of automobiles of different makes and models.

The holder includes an accurately machined mount 47 having a transverse slot 48 extending from top to bottom thereof and a tongue 49 entrant of the base groove 43. The base 42 carries a bolt 50 which extends upwardly through the slot 48 and is threaded to receive the lock nut 51 by which the mount 47 may be anchored in any position into which it has been moved. The bolt 50 when in engagement with one end of the slot 48, see Fig. 17, accurately establishes a first position of the mount.

The mount 47 is provided with a shoulder 52 spaced from the base 42 to receive thereunder the ends of the point carrying members and spring 53 on the member 23. The shoulder 52 is bored to receive the insert 54 which has a threaded bore to receive the threaded part 55 of the spindle 56 which is accurately dimensioned to fit the bearing 34 of the arm 23. At its upper end, the spindle 56 has a knob 57.

In the first position of the spindle 56, it is axially alined with the stud 44 on the base 42 but when the mount 47 is moved from its first position, the relationship between the studs is eccentric. A gage block 58 has a bore 59, see Fig. 17, extending from top to bottom thereof to receive the screw 60 which extends downwardly therethrough and is threaded into the base 42. Screw 60 is of appreciably smaller diameter than the bore 59 and while it may be tightened to lock the block 58 in position, the block 58 may be moved when it is loosened.

The gage block is, of course, precisely machined and has a first position in which a face is in contact with the adjacent face of the mount 47 in the first position thereof. When the gage block 58 is anchored in that position and the lock nut 51 is loosened, the dressing tool may be inserted between the adjacent faces of the block and mount to serve as a gage to so locate the spindle 56 relative to the stud 44 that the point faces will be parallel when that tool is inserted therebetween.

The mount 47 is then locked against movement and the screw 60 loosened to free the gage block 58 to enable the tool to be removed from the holder without marring the adjacent faces of the block and mount.

The tool is then inserted between the point faces with the arm member 23 held against movement as by manually compressing the spring 53. The tool may be the tool 40 which is indicated as of the point file type but for most accurate work, an abrasive wheel 61 carried by a shaft 62 is employed.

From the foregoing, it will be apparent that holders in accordance with the invention make possible precision dressing of point faces since they provide accurate means for so locating the point carrying members that their faces are parallel when spaced apart a distance equal to the thickness of the dressing tool.

What I therefore claim and desire to secure by Letters Patent is:

1. A holder for use in simultaneously dressing with a tool distributor and like points of the type in which one contact point is carried by a bracket member and the other contact point is carried by an arm member, said members having apertures of different diameters to receive correspondingly dimensioned concentric parts of a stud, said holder comprising a first pivot element dimensioned to fit one of said member apertures, a second pivot element dimensioned to fit the other member aperture, and means to anchor one of said members against pivotal movement, said pivot elements being eccentric with reference to each other to an extent sufficient to effect a parallel relationship between the adjacent point faces when said faces are spaced apart a distance equal to the thickness of said tool.

2. A holder for use in simultaneously dressing with a tool distributor and like points of the type in which one contact point is carried by a bracket member and the other contact point is carried by an arm member, said members having apertures of different diameters to receive correspondingly dimensioned concentric parts of a stud, said holder comprising first and second studs and supporting structure therefor, said first stud being dimensioned to fit the aperture of one member and second stud being dimensioned to fit the aperture of the other member, and means to anchor one member to said structure to hold it against pivotal movement, said studs being eccentric with reference to each other to an extent sufficient to effect a parallel relationship between the adjacent point faces when the pivotable member is turned to enable said tool to be inserted between said faces.

3. A holder for use in simultaneously dressing with a tool distributor and like points of the type in which one contact point is carried by a bracket member and the other contact point is carried by an arm member and both of said members having apertures of different diameters to receive correspondingly dimensioned concentric parts of a stud, said holder comprising a base, an upstanding stud on said base dimensioned to fit the aperture of the bracket member, a mount including a depending stud dimensioned to fit the aperture of said arm member, means to anchor said bracket member to said base against pivotal movement, means interconnecting said mount to said base for relative movement therebetween from a position in which said studs are axially alined into a position in which the mount stud is off-center relative to the base stud by a distance sufficient to bring the point faces in parallel when a tool is inserted therebetween.

4. A holder for use in simultaneously dressing with a tool distributor and like points of the type in which one contact point is carried by a first member and the other contact point is carried by a pivotable arm member so located that the point faces are approximately parallel when in engagement, said holder comprising a base, means on said base to anchor said first member in a predetermined position thereon, a mount including means pivotably supporting said arm member, means connecting said mount to said base for movement to enable relative movement therebetween to be effected from a position in which the original relationship between said members is established into a position in which said arm member is so relocated as to effect a parallel relationship between the adjacent face of said points when a tool is inserted therebetween.

5. A holder for use in simultaneously dressing with a dressing tool distributor and like points of the type in which one contact point is carried by a bracket member and the other contact point is carried by an arm member, both of said members having apertures of different diameters to receive correspondingly dimensioned concentric parts of a stud, said holder comprising a base having a transverse groove, an upstanding stud on said base dimensioned to fit the aperture of the bracket member, and means to anchor said bracket member to said base; a mount slidable on said base for movement into and out of a first position and including a tongue portion entrant of said groove and a depending stud dimensioned to fit the aperture of said arm member and to axially aline with said base stud in the first position of said mount; a gage block mounted on said base for movement into and out of a first position in which it abuts the mount when said mount is in its first position, separate means to anchor said mount and said block to said base in any of their positions, movement of said mount from its first position spacing it from said block to receive the dressing tool therebetween thereby to relocate the mount stud to provide parallelism between the faces of said points when that tool is inserted therebetween, and movement of said block from its first position freeing said tool for such insertion.

6. A holder for use in simultaneously dressing with a dressing tool distributor and like points of the type in which one contact point is carried by a first member and the other contact point is carried by a pivotable arm member so located that the point faces are approximately parallel when in engagement, said holder comprising a base having a transverse groove, and means to anchor said first member to said base in a predetermined position; a mount slidable on said base into and out of a first position and including a tongue portion entrant of said groove and means pivotably supporting said arm member and positioned to establish the orginal relationship between said member in the first position of said mount, a gage block mounted on said base for movement into and out of a first position in which it abuts the mount when said mount is in its first position, separate means to anchor said mount and said block to said base, movement of said mount from its first position spacing it for said block to receive the dressing tool thereby to relocate said arm member supporting means to provide parallelism between the faces of said points when that tool is inserted therebetween, and movement of said block from its first position freeing said tool for such insertion.

7. A holder for use in simultaneously dressing with a dressing tool distributor and like points of the type in which one contact point is carried by a pivotable arm member so located that the point faces are approximately parallel when in engagement, said holder comprising a base having a transverse groove and means to anchor said first member to said base in a predetermined position; a mount slidable on said base including a groove entering tongue and having a transversely disposed vertical slot, said base also including a bolt extending upwardly through said slot, a nut on said bolt to enable said mount to be locked to said base against movement, said bolt serving as a stop to establish a first mount position, said mount also including means pivotably supporting said arm member and positioned to establish the original relationship between said members in the first position of said mount, a gage block mounted on said base for movement into and out of a first position in which it abuts the mount when said mount is in its first position, means to anchor said block to said base, movement of said mount from its first position spacing it from said block to receive the dressing tool thereby to relocate said arm member supporting means to provide parallelism between the faces of said points when that tool is inserted therebetween, and movement of said block from its first position freeing said tool for such insertion.

8. A holder for use in simultaneously dressing with a dressing tool distributor and like points of the type in which one contact point is carried by a first member and the other contact point is carried by a pivotable arm member so located that the point faces are approximately parallel when in engagement, said holder comprising a base having a transverse groove, and means to anchor said first member to said base in a predetermined position, a mount slidable on said base into and out of a first position and including a tongue portion entrant of said groove and means pivotably supporting said arm member and positioned to establish the original relationship between said members in the first position of said mount, means to lock said mount to said base in any of its positions, a gage block having a bore extending vertically therethrough, a gage anchoring element extending through said bore and threaded into said base and operable to lock said block in a first position in which it abuts the mount when said mount is in its first position, movement of said mount from its first position spacing it for said block to receive the dressing tool thereby to relocate said arm member supporting means to provide parallelism between the faces of said points when that tool is inserted therebetween, and said element being of sufficiently smaller diameter than said bore to enable said block to be moved from its first position to free said tool for such insertion.

9. A holder for use in simultaneously dressing with a dressing tool distributor and like points of the type in which one contact point is carried by a first member and the other contact point is carried by a pivotable arm member having a stud receiving aperture so located that the point faces are approximately parallel when in engagement, said holder comprising a base having a transverse groove, and means to anchor said first member to said base in a predetermined position, a mount slidable on said base into and out of a first position and including a tongue portion entrant of said groove, a shoulder spaced from said base, and a stud carried by said shoulder for vertical adjustment and dimensioned to fit the aperture of said arm member, and in said first position said stud being positioned to establish the original relationship between said members in the first position of said mount, a gage block mounted on said base for movement into and out of a first position in which it abuts the mount when said mount is in its first position, separate means to anchor said mount and said block to said base, movement of said mount from its first position spacing it from said block to receive the dressing tool thereby to relocate said stud to provide parallelism between the faces of said points when that tool is inserted therebetween, and movement of said block from its first position freeing said tool for such insertion.

10. A contact point holder for use in accurately finishing new and used automobile ignition distributor and like contacts simultaneously in matched pairs or either one alone selectively to complete a pair, said contacts being of the type which includes a breaker member and a spacing member and in which, in operation, the breaker member has its pivot concentric with the pivot for the spacing member and the radius of the breaker member arc is equal to the radius of the spacing member arc when measurements are taken from the centre of the faces of the respective contacts to the center of the pivots, said holder comprising a base including means to anchor one member thereto in a predetermined position and a stud member to pivotally support the second member with the same distance separating the pivot centers and the contact faces when measured by parallel lines of which one is perpendicular to the face of the point anchored to the base and when the contact faces are approximately parallel.

11. A contact point holder for use in accurately finishing new and used automobile ignition distributor and like contacts simultaneously in matched pairs or either one alone selectively to complete a pair, said contacts being of the type which includes a breaker member and a spacing member and in which, in operation, the breaker member has its pivot concentric with the pivot for the spacing member and the radius of the breaker member arc is equal to the radius of the spacing member arc when measurements are taken from the centre of the faces of the respective contacts to the center of the pivots, said holder comprising a base including means to anchor one member thereto in a predetermined position and including a stud for centering its pivotable end, and a part including a stud to center the pivotable end of the other member and being slidably connected to said base for movement between a position in which the stud centers register into a position in which they and the contact faces are offset by the same distance when the contact faces are approximately parallel, the center of the contact faces of said other member being then included in a line perpendicular to the center of the contact face of the anchored member.

12. A contact point holder for use in accurately finishing new and used automobile ignition distributor and like contacts simultaneously in matched pairs or either one alone selectively to complete a pair, said contacts being of the type which includes a breaker member and a spacing member and in which, in operation, the breaker member has its pivot concentric with the pivot for the spacing member and the radius of the breaker member arc is equal to the radius of the spacing member arc when measurements are taken from the centre of the faces of the respective contacts to the center of the pivots, said holder comprising a base including means to anchor one member thereto in a predetermined position and including a stud for centering its pivotable end, and a part including a stud to center the pivotable end of the other member and being slidably connected to said base for movement between a position in which the stud centers register into a position in which they and the contact faces are offset by the same distance when the contact faces are approximately parallel, the center of the contact faces of said other member being then included in a line perpendicular to the center of the contact face of the anchored member, and means to lock said part in any of its positions.

13. A contact point holder for use in accurately finishing new and used automobile ignition distributor and like contacts with a dressing tool simultaneously in matched pairs or either one alone selectively to complete a pair, said contacts being of the type which includes a breaker member and a spacing member and in which, in operation, the breaker member has its pivot concentric with the pivot for the spacing member and the radius of the breaker member arc is equal to the radius of the spacing member arc when measurements are taken from the centre of the faces of the respective contacts to the center of the pivots, said holder comprising a base part including means to anchor one member thereto in a predetermined position and including a stud for centering its pivotable end, and a second part including a stud to center the pivotable end of the other member and being slidably connected to said base part for movement between a position in which the stud centers register into a position in which they and the contact faces are offset by the same distance when the contact faces are approximately parallel, the center of the contact faces of said other member being then included in a line perpendicular to the center of the contact face of the anchored member, and a gage block attached to one of said parts for engagement with the other of said parts when the centers of said studs are in register, relative movement between said block and said other part spacing said block therefrom to receive the dressing tool and to effect the offset relationship between said studs.

14. A contact point holder for use in accurately finishing new and used automobile ignition distributor and like contacts with a dressing tool simultaneously in matched pairs or either one alone selectively to complete a pair, said contacts being of the type which includes a breaker member and a spacing member and in which, in operation, the breaker member has its pivot concentric with the pivot for the spacing member and the radius of the breaker member arc is equal to the radius of the spacing member arc when measurements are taken from the centre of the faces of the respective contacts to the center of the pivots, said holder comprising a base part including means to anchor one member thereto in a predetermined position and including a stud for centering its pivotable end, and a second part including a stud to center the pivotable end of the other member and being slidably connected to said base part for movement between a position in which the stud centers register into a position in which they and the contact faces are offset by the same distance when the contact faces are approximately parallel, the center of the contact faces of said other member being then included in a line perpendicular to the center of the contact face of the anchored member, a gage block, and a releasable connection between said block and one of said parts for engagement with the other of said parts when said stud centers register, relative movement between said block and said other part spacing said block therefrom to receive the dressing tool and to effect the offset relationship between said studs, said releasable connection being operable to free the tool without effecting movement between said studs.

References Cited in the file of this patent

UNITED STATES PATENTS

| Number | Name | Date |
|---|---|---|
| 1,285,344 | Orban et al. | Nov. 19, 1918 |
| 1,416,366 | Lindholm | May 16, 1922 |
| 1,429,801 | Thomas | Sept. 19, 1922 |
| 1,436,436 | Poole et al. | Nov. 21, 1922 |
| 1,519,828 | Fusay | Dec. 16, 1924 |
| 1,688,212 | Van Dervort | Oct. 16, 1928 |
| 1,914,225 | Walters | June 13, 1933 |
| 1,951,201 | Oakley | Mar. 13, 1934 |
| 2,013,262 | Wilsey | Sept. 3, 1935 |
| 2,125,709 | Bauer | Aug. 2, 1938 |
| 2,184,508 | Major | Dec. 26, 1939 |
| 2,277,639 | Hamilton | Mar. 24, 1942 |
| 2,474,086 | Bartlow | June 21, 1949 |
| 2,532,512 | Paget | Dec. 5, 1950 |